US011893682B1

(12) United States Patent
Tay et al.

(10) Patent No.: US 11,893,682 B1
(45) Date of Patent: Feb. 6, 2024

(54) METHOD FOR RENDERING 2D AND 3D DATA WITHIN A 3D VIRTUAL ENVIRONMENT

(71) Applicant: Direct Current Capital LLC, Wilmington, DE (US)

(72) Inventors: Kah Seng Tay, Mountain View, CA (US); Qing Sun, Mountain View, CA (US); James Patrick Marion, Mountain View, CA (US)

(*) Notice: Subject to any disclaimer, the term of this patent is extended or adjusted under 35 U.S.C. 154(b) by 0 days.

(21) Appl. No.: 17/963,087

(22) Filed: Oct. 10, 2022

Related U.S. Application Data

(63) Continuation of application No. 17/107,647, filed on Nov. 30, 2020, now Pat. No. 11,468,646, which is a continuation of application No. 16/379,728, filed on Apr. 9, 2019, now Pat. No. 10,854,011.

(60) Provisional application No. 62/655,116, filed on Apr. 9, 2018.

(51) Int. Cl.

| | |
|---|---|
| *G06T 17/00* | (2006.01) |
| *G06T 19/00* | (2011.01) |
| *G01S 17/89* | (2020.01) |
| *G01S 17/93* | (2020.01) |
| *G05D 1/00* | (2006.01) |
| *G06T 7/521* | (2017.01) |

(52) U.S. Cl.
CPC .............. *G06T 17/00* (2013.01); *G01S 17/89* (2013.01); *G01S 17/93* (2013.01); *G05D 1/0044* (2013.01); *G05D 1/0088* (2013.01); *G06T 7/521* (2017.01); *G06T 19/006* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 7,840,355 B2 | 11/2010 | Breed et al. | |
| 8,194,998 B2 | 6/2012 | Saito | |
| 8,311,343 B2 | 11/2012 | Chung | |
| 8,488,877 B1 | 7/2013 | Owechko et al. | |
| 8,731,816 B2 | 5/2014 | Dintzer et al. | |
| 8,907,771 B2 | 12/2014 | Vasquez et al. | |
| 10,854,011 B2 | 12/2020 | Tay et al. | |

(Continued)

OTHER PUBLICATIONS

U.S. Appl. No. 15/271,702, filed Sep. 21, 2016, Ohn-Bar et al.

(Continued)

*Primary Examiner* — Frank S Chen
(74) *Attorney, Agent, or Firm* — Polsinelli PC

(57) ABSTRACT

One variation of a method includes: accessing a 2D color image recorded by a 2D color camera and a 3D point cloud recorded by a 3D depth sensor at approximately a first time, the 2D color camera and the 3D depth sensor defining intersecting fields of view and facing outwardly from an autonomous vehicle; detecting a cluster of points in the 3D point cloud representing a continuous surface approximating a plane; isolating a cluster of color pixels in the 2D color image depicting the continuous surface; projecting the cluster of color pixels onto the plane to define a set of synthetic 3D color points in the 3D point cloud, the cluster of points and the set of synthetic 3D color points representing the continuous surface; and rendering points in the 3D point cloud and the set of synthetic 3D color points on a display.

15 Claims, 7 Drawing Sheets

(56) References Cited

U.S. PATENT DOCUMENTS

| | | |
|---|---|---|
| 2008/0319670 A1 | 12/2008 | Yopp et al. |
| 2010/0209013 A1 | 8/2010 | Minear et al. |
| 2011/0098890 A1 | 4/2011 | Lundmark et al. |
| 2011/0286628 A1 | 11/2011 | Goncalves et al. |
| 2012/0027255 A1 | 2/2012 | Endo |
| 2012/0158250 A1 | 6/2012 | Stiegler |
| 2014/0032093 A1 | 1/2014 | Mills |
| 2014/0035777 A1 | 2/2014 | Kim et al. |
| 2014/0067162 A1* | 3/2014 | Paulsen ................ G05D 1/0044 701/2 |
| 2014/0343750 A1 | 11/2014 | Minemura et al. |
| 2015/0009010 A1 | 1/2015 | Biemer |
| 2015/0294192 A1 | 10/2015 | Lan et al. |
| 2017/0345321 A1* | 11/2017 | Cross .................... B64D 45/08 |
| 2019/0026956 A1 | 1/2019 | Gausebeck et al. |
| 2019/0108396 A1 | 4/2019 | Dal Mutto et al. |
| 2019/0120947 A1 | 4/2019 | Wheeler et al. |
| 2019/0164018 A1* | 5/2019 | Zhu ........................... G06T 7/11 |
| 2019/0287254 A1 | 9/2019 | Lakshmi Narayanan et al. |
| 2019/0291723 A1 | 9/2019 | Srivatsa et al. |
| 2019/0362178 A1 | 11/2019 | Huang et al. |
| 2020/0349742 A1 | 11/2020 | Wang et al. |
| 2021/0021495 A1* | 1/2021 | Sawabe ................ H04L 43/067 |

OTHER PUBLICATIONS

U.S. Appl. No. 15/271,704, filed Sep. 21, 2016, Ohn-Bar et al.
U.S. Appl. No. 16/587,942, filed Sep. 30, 2019, Song et al.
U.S. Appl. No. 16/781,165, filed Feb. 2020, Foster et al.
U.S. Appl. No. 16/834,974, filed Mar. 30, 2020, Lim et al.

* cited by examiner

METHOD FOR RENDERING 2D AND 3D DATA WITHIN A 3D VIRTUAL ENVIRONMENT

CROSS-REFERENCE TO RELATED APPLICATIONS

This Application is a continuation of U.S. patent application Ser. No. 17/107,647, entitled "METHOD FOR RENDERING 2D AND 3D DATA WITHIN A 3D VIRTUAL ENVIRONMENT," filed on Nov. 30, 2022, which is a continuation of U.S. patent application Ser. No. 16/379,728, entitled "METHOD FOR RENDERING 2D AND 3D DATA WITHIN A 3D VIRTUAL ENVIRONMENT," filed on Apr. 9, 2019, which claims the benefit of U.S. Provisional Application Ser. No. 62/655,116, entitled "METHOD FOR RENDERING 2D AND 3D DATA WITHIN A 3D VIRTUAL ENVIRONMENT," filed on Apr. 9, 2018, each of which is incorporated by reference in its entirety herein.

TECHNICAL FIELD

This invention relates generally to the field of autonomous vehicles and more specifically to a new and useful method for rendering 2D and 3D data within a 3D virtual environment in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
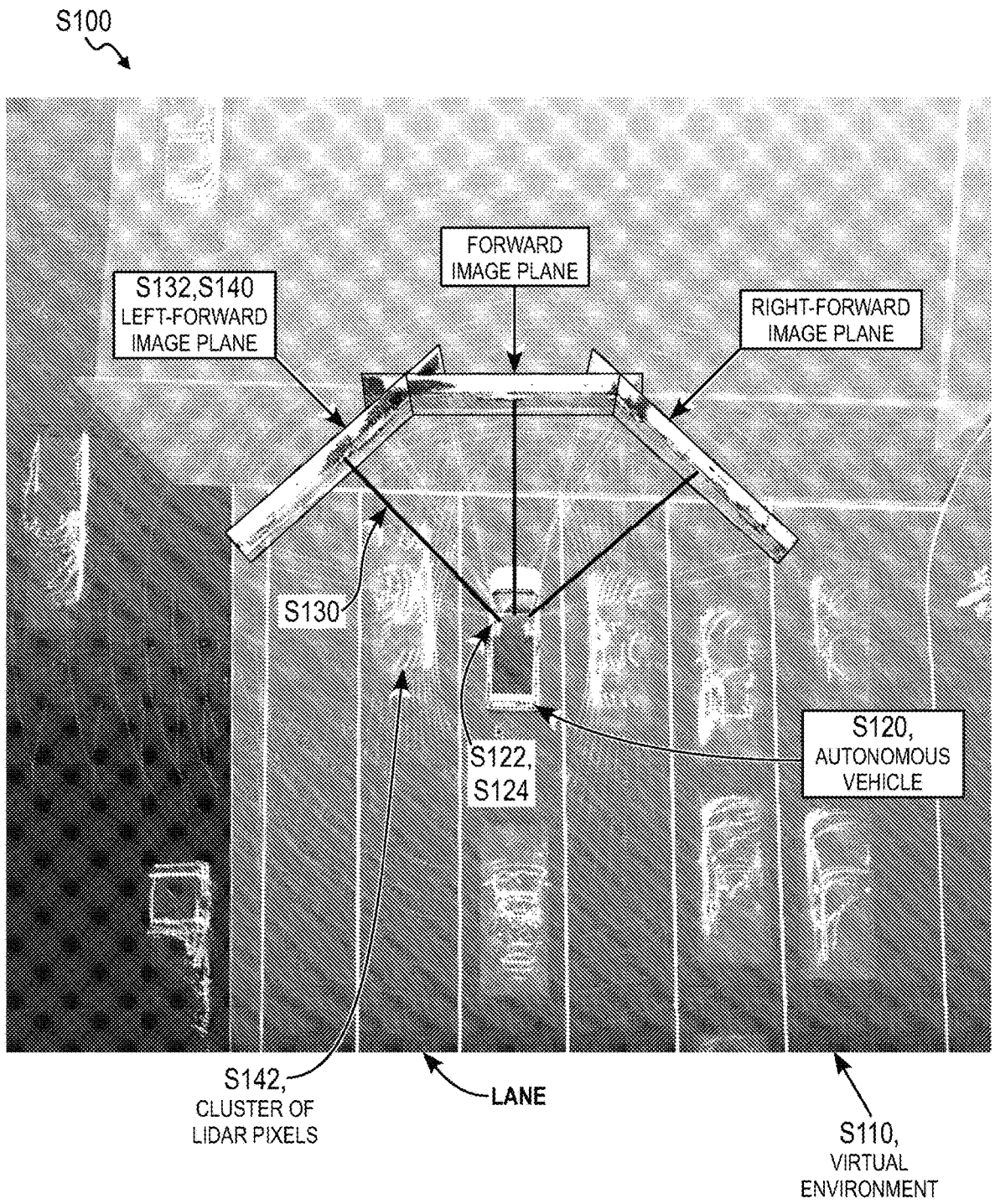
FIG. 1 is a graphical representation of a first method.
Figure 2:
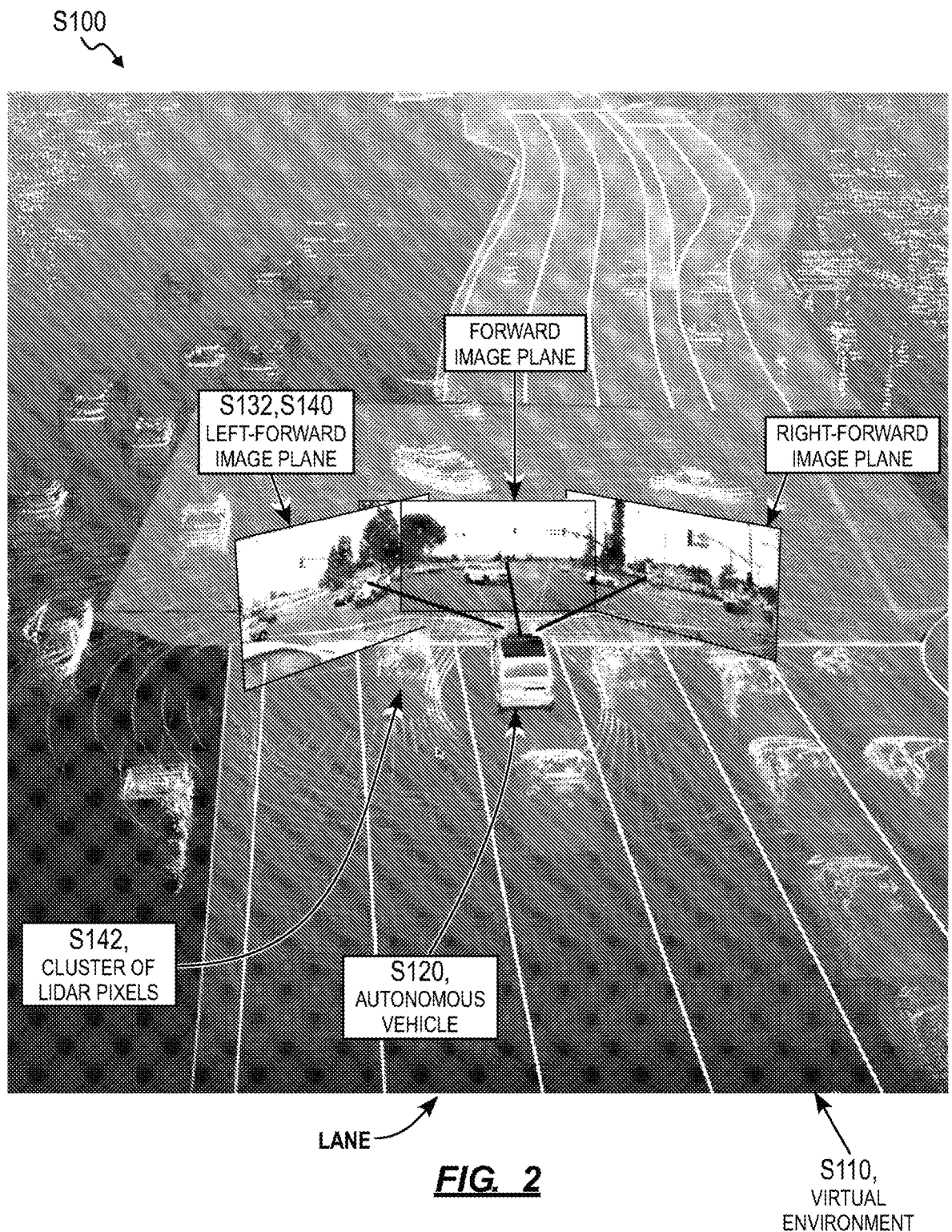
FIG. 2 is a graphical representation of one variation of the first method.
Figure 3A:
FIGS. 3A-3D are graphical representations of one variation of the first method.
Figure 3B:
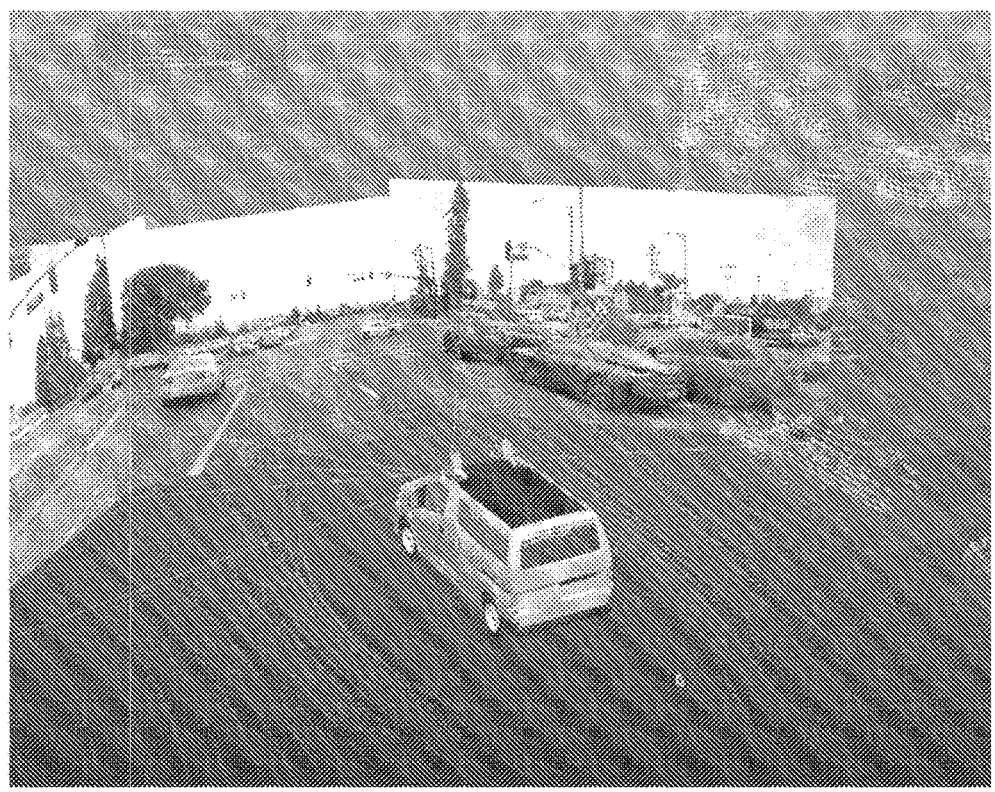
Figure 3C:
Figure 3D:

As shown in FIGS. 1 and 2, a first method S100 for rendering 2D and 3D data within a 3D virtual environment includes: generating the 3D virtual environment in Block S110; defining a vehicle origin representing an autonomous vehicle in the 3D virtual environment in Block S120; defining a LIDAR origin in the 3D virtual environment based on a known (or estimated) position of a LIDAR sensor on the autonomous vehicle in Block S122; defining a camera origin in the 3D virtual environment based on a known (or estimated) position of a camera on the autonomous vehicle in Block S124; calculating a ray passing through the camera origin and representing a principle axis of the camera in Block S130; defining an image plane normal to the ray and offset from the camera origin in a horizontal plane by a target offset distance in the 3D virtual environment in Block S132; projecting a sequence of 2D images recorded by the camera onto the image plane in Block S140; and rendering a concurrent sequence of 3D LIDAR frames, recorded by the LIDAR sensor, relative to the LIDAR origin within the 3D virtual environment in Block S142.

1.1 Applications

Generally, the first method S100 can be executed by a system (e.g., a remote computer system, a computer network, and/or an annotation portal executed on a local computing device) to simultaneously render concurrent 3D LIDAR and 2D image data—recorded by sensors on a vehicle—within a single virtual environment to enable a human annotator, vehicle technician, or rider to quickly ascertain alignment between these 3D LIDAR and 2D image data and to more easily comprehend correspondence between the 3D LIDAR and 2D image data. In particular, rather than stitching multiple concurrent 2D image images into a 3D color image and aligning this 3D color image with a concurrent 3D LIDAR image—which may be processing-intensive, data-intensive, and/or time-consuming for a local computer or computer network to execute the system can instead: define a 3D virtual environment; define 2D image planes at key positions within the 3D virtual environment; render 3D LIDAR images in sequence within the virtual environment; and project concurrent 2D images onto corresponding 2D image planes in the virtual environment.

Therefore, to enable a human annotator (or a technician, or a rider, as described below) to visually interpret 3D LIDAR data from a LIDAR sensor arranged on the autonomous vehicle, the system can present these 3D LIDAR data within a 3D virtual environment. To further improve the human annotator's comprehension of these 3D LIDAR data, the system can define 2D image planes within this 3D virtual environment and project 2D color images onto these 2D image planes based on known (or estimated) relative positions of LIDAR sensors and color cameras on the autonomous vehicle, thereby fusing 3D point and 2D color data within one, visually discernible virtual environment.

In one implementation, the system accesses 3D LIDAR frames (e.g., 3D point clouds) and 2D images (e.g., 2D image images) recorded by an autonomous vehicle (or by a manually-operated vehicle outfitted with LIDAR and color cameras) and implements Blocks of the first method S100 to compile these 3D LIDAR and 2D images into one 3D environment within an annotator portal in which a human annotator manually labels objects represented in these 3D LIDAR and 2D image data. The system can define an origin in the virtual environment at a representation of the autonomous vehicle such that external objects—such as other vehicles, lane markers, road signs, and trees, etc.—are depicted in the virtual environment as moving relative to the representation of the autonomous vehicle. For each camera on the autonomous vehicle, the system can define an image plane that is perpendicular to the ground plane in the virtual environment, normal to the principle axis of the camera in a horizontal plane, and offset from an origin of the camera—represented in the virtual environment—by an offset distance. In this implementation, the system can set this offset distance such that an image plane defined for a 2D image feed recorded by a laterally-facing camera (e.g., a left-forward camera, a right-forward camera) on the autonomous vehicle is approximately centered on an adjacent road lane represented in the virtual environment.

By then projecting 2D image feeds from these laterally-facing cameras onto their corresponding image planes while rendering concurrent 3D LIDAR data (e.g., concurrent 3D point clouds recorded by a set of LIDAR sensors on the autonomous vehicle) within the virtual environment according to Blocks of the first method S100, the system can present clusters of points passing through an image plane while 2D images projected onto the image plane depict a vehicle moving past the field of view of the camera that recorded these 2D images, as shown in FIGS. 3A-3D. The human annotator viewing the virtual environment may quickly, visually discern a correlation between this cluster of points and the vehicle depicted in this sequence of 2D images projected onto the image plane given alignment between these 3D and 2D data within the 3D virtual environment. Accordingly, the human annotator may quickly select and label this cluster of points as a vehicle.

1.2 Autonomous Vehicle and Data Collection

The first method S100 can be executed by a computer system (e.g., a remote server, hereinafter the "system") in conjunction with an autonomous vehicle. The autonomous vehicle can include: a suite of sensors configured to collect information about the autonomous vehicle's environment; local memory storing a navigation map defining lane connections and nominal vehicle paths for a road area and a localization map that the autonomous vehicle implements to determine its location in real space; and a controller. The controller can: calculate a nominal path between the autonomous vehicle's current location and a destination based on the navigation map; determine the location of the autonomous vehicle in real space over time based on sensor data collected from the suite of sensors and the localization map; determine the context of a scene around the autonomous vehicle based on these sensor data; elect a future action (e.g., a navigational decision) to remain on or deviate from the nominal path based on the context of the scene around the autonomous vehicle and the real geospatial location of the autonomous vehicle; and control actuators within the vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, left lateral, and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, a controller integrated into the autonomous vehicle can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration, or deceleration (e.g., brake position)—to move toward a specified destination based on the autonomous vehicle's current position and the scene around the vehicle, such as by passing the autonomous vehicle's position, identified dynamic objects in the local scene, and the autonomous vehicle's destination into a navigational model (e.g., a navigational neural network). The autonomous vehicle can therefore implement one or more neural networks locally to determine its location, perceive its surroundings, and select future actions.

The remote computer system can implement Blocks of the first method S100: to collect LIDAR and color image data from autonomous vehicles and/or manually-operated road vehicles with similar sensor suites; to compile these LIDAR and color image data into a visualization that, when rendered within an annotation portal, enables an human annotator to quickly attribute localization-, perception-, and motion planning-related labels to these optical data with limited mental load; and to generate and refine localization/perception, navigational, and/or other neural networks—for implementation by these autonomous vehicles—over time based on labels manually inserted into this visualization by the human operator.

The first method S100 is described herein as executed by the system to assist a human annotator annotating 3D LIDAR and 2D image data recorded by a ground-based passenger, commercial, or fleet vehicle. However, Blocks of the first method S100 can be executed by the system to assist the human annotator when annotating 3D LIDAR and 2D image data recorded by a vehicle of any other type.

As described below, the first method S100 can additionally or alternatively be executed by the system to assist a technician diagnosing sensors on the autonomous vehicle or locally by the autonomous vehicle to generate a visual representation of its perception of its local environment, as described below.

1.3 Vertical Image Planes

To prepare 3D LIDAR and 2D image data recorded by an autonomous vehicle for manual annotation by a human annotator, the system can: generate a virtual environment including a vehicle origin representing a reference point on the autonomous vehicle; and define a LIDAR origin of a LIDAR sensor and a camera origin of the color camera relative to the vehicle origin in the virtual environment based on known positions and orientations of the LIDAR sensor and the camera relative to the reference point on the autonomous vehicle. (The annotation portal can later inject 3D LIDAR frames—such as in the form of 3D point clouds—into the virtual environment relative to the LIDAR origin.) The system can then define an image plane onto which a 2D image recorded by the camera is projected into the virtual environment.

1.3.1 Static Image Plane

In one implementation, the system calculates a ray defining a projection of the principle axis of the camera onto a horizontal plane—passing through the camera origin—in the virtual environment based on a known position and orientation of the camera on the autonomous vehicle.

In this implementation, the system then specifies a length of the ray from the camera origin. In one example, the system calculates a ray length that places the end of the ray—opposite the camera origin—in the center of an adjacent road lane. In this example, for 2D images recorded by a camera arranged at a yaw angle of 45° to the left of the longitudinal axis of an autonomous vehicle traversing roads in the United States in which a 12-foot (or 3.7-meter) lane width is standard, the system can calculate a ray length of 4.3 meters (or 3.7 meters/sin(45°)×sin(90°)) for a ray extending 45° to the left of the longitudinal axis of the autonomous vehicle, which may locate the end of the ray at approximately the center of a lane to the immediate left of the autonomous vehicle, assuming that the autonomous vehicle is occupying the approximate center of its lane.

The system can then: define an image plane normal to the ray intersecting the end of the ray (i.e., offset from the camera origin in the horizontal plane by the ray length); and calculate a transform that projects the field of view of the camera onto the image plane based on the known position and orientation of the camera on the autonomous vehicle (e.g., relative to the reference point on the autonomous vehicle) and based on known intrinsic and extrinsic properties of the camera (e.g., focal length, imager dimensions, zoom, inherent optical aberration). The system (e.g., the annotation portal) can later project a sequence of 2D images—recorded by the camera—onto the image plane based on this transform while simultaneously rendering concurrent LIDAR frames in the virtual environment.

The system can repeat this process to define one image plane for each other color camera on the autonomous vehicle.

Furthermore, the system is described above and below as defining an image plane with its horizontal center virtually centered on a corresponding lane proximal the autonomous vehicle. However, the system can align any other horizontal reference point in the image plane with the center of the corresponding lane. For example, for a color camera plane of a left-forward camera, the system can align a pixel one-third of the width of the image plane from the right edge of the image plane with the center of the corresponding lane.

1.3.2 Multiple Image Planes per Camera

In another implementation, the system defines multiple image planes per camera on the autonomous vehicle. In one example, for a left-forward color camera arranged on the autonomous vehicle (e.g., a camera defining a principle axis angularly offset from the longitudinal axis of the autonomous vehicle by 45°), the system can: insert a vehicle origin into the virtual environment; insert a LIDAR origin and a camera origin—for the left-forward color camera—into the virtual environment relative to the vehicle origin; and calculate a ray defining a projection of the principle axis of the camera onto the horizontal plane intersecting the camera origin in the virtual environment; as described above. The system can then: locate a first image plane normal to the ray with the horizontal center of the first image plane laterally offset from the vehicle origin by a standard or average lane width in the geographic region occupied by the autonomous vehicle (e.g., 3.7 meters in the United States); and calculate a first transform that projects the field of view of the left-forward camera onto the image plane based on the known position, orientation, intrinsic properties, and extrinsic properties of the left-forward camera. The system can also: locate a second image plane normal to the ray with the horizontal center of the second image plane laterally offset from the vehicle origin by twice the standard lane width in this geographic region; and calculate a second transform that projects the field of view of the left-forward camera onto the second image plane based on the known position, orientation, intrinsic properties, and extrinsic properties of the left-forward camera.

Thus, during annotation of 3D LIDAR and 2D image data recorded by this autonomous vehicle, the system (e.g., the annotation portal) can apply the first transform to a color image recorded by the left-forward camera to project the color image onto the first image plane and simultaneously apply the second transform to the same color image to project the color image onto the second image plane while rendering a concurrent 3D LIDAR frame within the virtual environment. The system can repeat this process for a subset of concurrent 2D images and 3D LIDAR frames recorded by the autonomous vehicle according to the first and second transforms.

Therefore, by rendering a sequence of color images recorded by the left-forward camera onto the first and second image planes according to this process while simultaneously rendering concurrent LIDAR frames within the virtual environment, the system can: depict clusters of points representing a first vehicle—moving relative to the autonomous vehicle in the lane immediately to the left of the autonomous vehicle—passing through the first image plane and intersecting a visual color representation of the first vehicle in images rendered on the first color image frame; and simultaneously depict clusters of points representing a second vehicle—moving relative to the autonomous vehicle in a second lane to the left of the autonomous vehicle—passing through the second image plane and intersecting a visual color representation of the second vehicle in images rendered on the first color image frame.

The system can implement similar methods and techniques to define one image plane approximately centered in each lane depicted in a 2D image recorded by the autonomous vehicle. For example, the system can access a map or database of georeferenced lane positions along public roads within a geographic region and define image planes—centered on adjacent lanes defined in the map or database—based on geolocation tags stored in metadata of 3D LIDAR and/or 2D images recorded by the autonomous vehicle.

1.3.3 Derived Image Plane Offset Distances

In another implementation, the system can: implement computer vision and/or artificial intelligence techniques to automatically detect lane markers in a 2D image recorded by a camera on the autonomous vehicle; estimate a real lateral distance between parallel lane markers detected in the 2D image; and define image planes in the virtual environment based on this lateral distance between parallel lane markers. For example, the system can scan a color image recorded by a forward-facing camera on the autonomous vehicle for lane markers; and estimate lateral offset distances from the reference point on the autonomous vehicle to centers of lanes to the left and right of the autonomous vehicle based on locations of these lane markers and a known position of the forward-facing camera on the autonomous vehicle. The system can then define image planes with centers offset from the vehicle origin in the virtual environment by these lateral offset distances.

For example, if the system estimates a first lateral offset distance of 2.0 meters from the reference point on the autonomous vehicle to a first lane immediately to the left of the autonomous vehicle and a second lateral offset distance of 5.5 meters from the reference point on the autonomous vehicle to a second lane to the left of the autonomous vehicle, the system can define a first image plane centered 2.0 meters to the left of the vehicle origin and a second image plane centered 5.5 meters to the left of the vehicle origin in the virtual environment for a left-forward-facing camera on the autonomous vehicle. In this example, if the system also estimates a third lateral offset distance of 1.7 meters from the reference point on the autonomous vehicle to a third lane immediately to the right of the autonomous vehicle, the system can define a third image plane centered 1.7 meters to the right of the vehicle origin in the virtual environment for a right-forward-facing camera on the autonomous vehicle. In this example, the system can similarly define image planes for left- and right-facing cameras on the autonomous vehicle.

In this implementation, the system can alternatively detect lane markers in the 3D LIDAR frames, estimate lateral distances from the reference point on the autonomous vehicle to the centers of adjacent lanes, and define image planes based on these LIDAR-based lateral distances.

The system can therefore derive offset distances for image planes in the virtual environment based on data extracted from 3D LIDAR and/or 2D images recorded by the autonomous vehicle. The system can also recalculate these offset distances intermittently, for each color image frame recorded by the autonomous vehicle, or when the system detects lane markers in these optical data (e.g., with at least a minimum degree of confidence), etc.

1.3.4 Image Plane Offset Distance by Color Image Overlap

In yet another implementation, the system defines ray lengths (or lateral offset distances) for image planes for cameras on the autonomous vehicle such that a 2D image recorded by a first camera and projected onto the image plane overlaps—by a limited horizontal distance (e.g., 5%)—a color image recorded by a second camera on the autonomous vehicle and projected onto an adjacent color plane.

(The autonomous vehicle can implement similar methods and techniques to define a longitudinal offset distances for an image plane—that is, a forward distance from a camera, along the camera's field of view, to the corresponding image plane, as described below.)

1.3.5 Manual Image Plane Offset Distance

In another implementation, the system defines an image plane based on a lateral offset distance (or a ray length) set manually by a human annotator through the annotation portal. For example, the human annotator can manually adjust the position of an image plane relative to the virtual origin the virtual environment—such as with a slider—according to the annotation portal's personal preferences or until the virtual environment depicts alignment between clusters of LIDAR points moving through the image plane and object depicted in a sequence of 2D images projected onto the image plane.

1.4 Annotation Portal

An annotation portal—executing on a local computer system—can download 3D LIDAR and 2D image data, such as from a remote database via a computer network (e.g., the Internet). The annotation portal can receive definitions for image planes in the virtual environment from the computer network, or the annotation portal can implement the foregoing methods and techniques to define these image planes locally.

As shown in FIGS. 3A-3D, the annotation portal can then render the virtual environment, including a sequence of 3D LIDAR frames and concurrent sequences of 2D images projected onto corresponding image planes, and a predefined list of object labels, such as "car," "truck," "motorcycle," "pedestrian," "tree," etc. As the annotation portal renders these 3D LIDAR and 2D image data (e.g., at a nominal or reduced playback speed), the human annotator can: manually select a cluster of LIDAR points (or "pixels"), such as by selecting a representative point within the cluster or by drawing a virtual box around the cluster; and activate an object label—in the predefined set of object labels—for this selection in the current LIDAR frame. In this implementation, when the human annotator selects a representative point or the entirety of the cluster of LIDAR points, the system can highlight a corresponding region in a 2D image projected onto an image plane in the virtual environment, such as based on proximity of this cluster of LIDAR points to a discrete object detected in the projected 2D image as the cluster of LIDAR points passes through the image plane. Furthermore, when the human annotator activates a label for this cluster of LIDAR points, the annotation portal can indicate this label on the corresponding region of the projected 2D image, such as by highlighting the corresponding region of the projected 2D image in a color assigned to a type of the active label, which may better depict a correspondence or correlation between concurrent 3D LIDAR and 2D color image data, reduce mental load, and thus yield fewer annotator mistakes.

Alternatively, as the annotation portal renders these 3D LIDAR and 2D image data within the virtual environment, the human annotator can: manually select an object depicted in a 2D image projected onto an image plane, such as by selecting a representative point within a discrete object detected in the projected 2D image by the annotation portal (or by the remote computer system) or by drawing a virtual box around the discrete object; and activate an object label—in the predefined set of object labels—for this selection in the projected 2D image. In this implementation, when the human annotator selects the discrete object in the projected 2D image, the system can highlight a corresponding point or cluster of LIDAR points in the concurrent 3D LIDAR frame in the virtual environment, such as based on proximity of the discrete region of the projected 2D image to this cluster of LIDAR points to a discrete object detected in the projected 2D image as the cluster of LIDAR points passes through the image plane. Furthermore, when the human annotator activates a label for this discrete object represented in the projected 2D image, the annotation portal can indicate this label on the corresponding cluster of LIDAR points in the 3D LIDAR frame, such as by highlighting edges of a 3D box around the cluster of LIDAR points in a color assigned to a type of the active label.

The annotation portal can then implement object-tracking techniques to track the discrete object indicated by the human annotator in subsequent 3D LIDAR frames and 2D images and to project the active label onto the object in the subsequent frames.

In the variation described above in which the system (or the annotation portal) defines multiple image planes for one camera on the autonomous vehicle, the annotation portal can similarly: enable the human annotator to label clusters of LIDAR points passing through various image planes corresponding to this camera; and project these labels onto corresponding discrete objects—depicted in the same 2D image projected onto these multiple image planes; or vice versa.

1.5 2D Image Segmentation

In the implementations described above in which the system defines multiple image planes for a camera on the autonomous vehicle, the system can: implement computer vision techniques (e.g., edge detection, object detection) to detect discrete objects in a 2D image frame recorded by this camera; segment the image by detected objects; and estimate distances of these objects from the camera, such as based on sizes of these objects and/or changes in overlaps of these objects in preceding frames recorded by the camera. The system can then: associate each image segment with a nearest image plane—in the set of image planes defined for the camera—based on estimated distances of each object in the image and offset distances for each image plane in the set; project each segment of the image onto its associated image plane; and render these projections of all segments of the image simultaneously with concurrent 3D LIDAR data in the virtual environment.

The system can repeat this process for subsequent 2D images recorded by the camera as 3D LIDAR and 2D images recorded by the autonomous vehicle are replayed in the annotation portal such that clusters of LIDAR points—at different distances from the vehicle origin in the virtual environment and representing distinct objects in the field around the autonomous vehicle—cross these image planes as segments of color images projected onto these image planes depict the same objects moving across these image planes, thereby enabling the human annotator to quickly, visually link clusters of LIDAR points at different distances from the autonomous vehicle with discrete objects represented in segments of 2D images.

1.6 Horizontal Plane

In one variation, the system (e.g., the remote computer system, the annotation portal) implements similar methods and techniques: to project 2D images recorded by cameras on the autonomous vehicle onto a ground plane in the virtual environment; and to render concurrent 3D LIDAR frames in the virtual environment, thereby enabling the human annotator to visually link clusters of LIDAR points to discrete objects depicted in a composite 2D color ground plane image in the virtual environment.

In this variation, the annotation portal can also implement methods and techniques described above to record object labels written to clusters of LIDAR points by the human annotator, to project these object labels onto objects depicted in the composite 2D color ground plane image, and/or to project these object labels onto corresponding regions or original 2D images recorded by the autonomous vehicle. The annotation portal can additionally or alternatively record object labels written to discrete objects depicted in the composite 2D color ground plane image by the human annotator and to project these object labels onto clusters of LIDAR points.

1.7 Alternative Application: Technician Portal

In another implementation, the system accesses 3D LIDAR and 2D images recorded by an autonomous vehicle and implements Blocks of the first method S100 to compile these 3D LIDAR and 2D images into one 3D environment within a technician portal. The system can inject 3D LIDAR data into the virtual environment relative to a vehicle origin representing a reference point on the autonomous vehicle based on known default positions and orientations of LIDAR sensors—that recorded these 3D LIDAR data— relative to this reference point on the autonomous vehicle. By implementing techniques similar to those described above, the system can define image planes relative to the vehicle origin and project 2D images onto these 2D image planes based on known default positions and orientations of color cameras— that recorded these 2D images—relative to the reference point on the autonomous vehicle. The system can render these projected 2D images and concurrent 3D LIDAR data within the virtual environment. If the color cameras and LIDAR sensors remain in their default (or "intended", "selected", "prescribed", or "designed") positions and orientations on the autonomous vehicle, a cluster of LIDAR points representing an object (e.g., another vehicle) may pass through an image plane as a representation of this same object depicted in a 2D image is rendered along a similar path along the image plane; a technician viewing this sequence of 3D LIDAR and 2D images in the technician portal may therefore visually link the cluster of LIDAR points and the object in the projected 2D image as representing a common object and quickly visually confirm alignment between the LIDAR sensor(s) that recorded these 3D LIDAR data and the color camera that recorded these 2D images given such alignment between these representations of the object in the virtual environment.

However, if the color cameras and LIDAR sensors have shifted from their default positions and orientations on the autonomous vehicle, a cluster of LIDAR points representing an object (e.g., another vehicle) may be offset from a representation of the same object depicted in a 2D image projected onto the image plane; a technician viewing this sequence of 3D LIDAR and 2D images in the technician portal may therefore quickly detect misalignment between the LIDAR sensor(s) that recorded these 3D LIDAR data and the color camera that recorded these 2D images given such offset between these representations of the same object 3D LIDAR and 2D image data rendered in the virtual environment. Accordingly, the technician can flag the autonomous vehicle for maintenance or repair. For example, the technician can remotely disable autonomous operation of the autonomous vehicle through the technician portal until the autonomous vehicle has been repaired and alignment of sensors on the autonomous vehicle have been re-verified.

In one example, when the autonomous vehicle detects possible occurrence of a collision (or other high-impact event, such as impact with a pothole when traveling at speed), the autonomous vehicle can: automatically pull over into a shoulder and/or median; and stream 3D LIDAR and 2D image data to a remote server as other vehicles pass the stopped autonomous vehicle. The remote server can then serve these data to the technician portal, which can implement Blocks of the first method S100 to render these 3D LIDAR and 2D images within a virtual environment within the technician portal. By then determining whether passing vehicles depicted in 2D images projected onto image planes in the virtual environment sufficiently align to like clusters of LIDAR points in concurrent LIDAR frames rendered in the virtual environment, the technician can quickly visually ascertain whether the collision affected relative location sensors on the autonomous vehicle. Accordingly, the technician can selectively disable autonomous operation of the autonomous vehicle, permit the autonomous vehicle to autonomously navigate (at reduced speed) to a repair facility, or confirm that no damage is indicated.

The system can therefore implement Blocks of the first method S100 to align 3D LIDAR and 2D image data within one 3D virtual environment and to render this 3D virtual environment for a technician—with minimal processing to prepare these data for rendering—in order to enable the technician to quickly visually discern whether sensors in the autonomous vehicle are aligned. For example, the system can present 3D LIDAR and 2D image data to a technician through the technician portal, as described above: to enable the technician to remotely diagnose the autonomous vehicle, such as following a possible accident or impact; to enable the technician to achieve and confirm gross alignment of sensors on the autonomous vehicle when servicing the autonomous vehicle; or to enable the technician to set and refine relative positions of sensors on the autonomous vehicle during assembly of a sensor suite on the autonomous vehicle.

1.8 Alternative Application: Rider Portal

In yet another implementation, an autonomous vehicle accesses 3D LIDAR and 2D images recorded by an autonomous vehicle and implements Blocks of the first method S100 to compile these 3D LIDAR and 2D images into one 3D environment within a rider portal rendered in real-time on a display within the autonomous vehicle and visible to occupants in the autonomous vehicle (e.g., a "rider portal"). In particular, the autonomous vehicle can implement Blocks of the first method S100 to: define an image plane within the virtual environment for each color camera on the autonomous vehicle; inject 3D LIDAR data recorded by LIDAR sensors on the autonomous vehicle into the virtual environment in real-time; and project color images recorded by the color cameras onto corresponding 2D image planes in the virtual environment in real-time. By implementing Blocks of the first method S100 to compile these 3D LIDAR and 2D image data into one 3D virtual environment, the autonomous vehicle can depict a representation of the autonomous vehicle's perception of its local environment to its occupants in (very near) real-time without necessitating extensive processing power and without producing perceptible latency between recordation and presentation of these data that may occur when stitching 2D image data into 3D color images and aligning these 3D color images with concurrent 3D LIDAR images.

The autonomous vehicle can therefore implement Blocks of the first method S100 in real-time during autonomous operation in order to visually communicate its perception of its local environment to an occupant. The autonomous vehicle can also automatically label objects—such as pedestrians and other vehicles—detected in this virtual environment in real-time, thereby assuring the occupant that the autonomous vehicle's comprehension of its local environment is correct or sufficiently complete. Furthermore, by projecting 2D image data onto image planes in the 3D virtual environment while concurrent 3D LIDAR data is also rendered in the 3D virtual environment, the autonomous vehicle can generate a visual representation of its local environment that differs fundamentally in appearance from that of the real-world environment that it represents while also avoiding transformation of 2D data into 3D data, thereby reducing opportunity for content rendered by the autonomous vehicle in the rider portal to nauseate an occupant viewing the rider portal during operation of the autonomous vehicle.

2. Second Method

Figure 4:
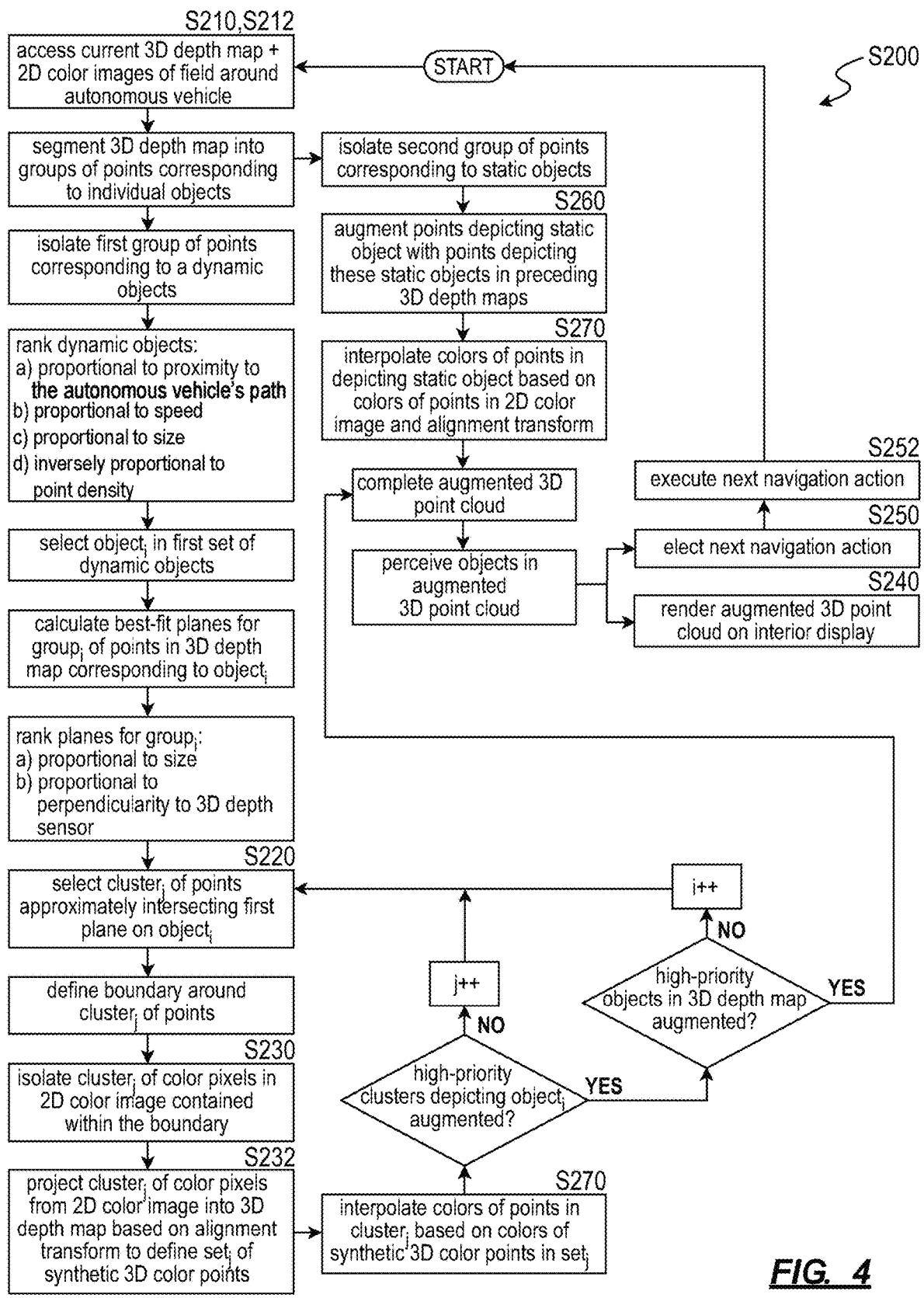
FIG. 4 is a flowchart representation of a second method.

As shown in FIG. 4, a second method S200 for augmenting 3D depth map data with 2D color image data includes: accessing a first 2D color image recorded at a first time via a 2D color camera arranged on an autonomous vehicle in Block S210; accessing a first 3D point cloud recorded at approximately the first time via a 3D depth sensor arranged on the autonomous vehicle in Block S212, the 3D depth sensor and the 2D color camera defining intersecting fields of view and facing outwardly from the autonomous vehicle; detecting a first cluster of points in the first 3D point cloud representing a first continuous surface approximating a first plane in Block S220; isolating a first cluster of color pixels in the first 2D color image depicting the first continuous surface in Block S230; projecting the first cluster of color pixels onto the first plane to define a first set of synthetic 3D color points in the first 3D point cloud in Block S232, the first cluster of points and the first set of synthetic 3D color points representing the first continuous surface; and rendering points in the first 3D point cloud and the first set of synthetic 3D color points on a display in Block S240.

One variation of second method S200 includes: accessing a first 2D color image recorded at a first time via a 2D color camera arranged on an autonomous vehicle in Block S21o; accessing a first 3D point cloud recorded at approximately the first time via a 3D depth sensor arranged on the autonomous vehicle, the 3D depth sensor and the 2D color camera defining intersecting fields of view and facing outwardly from the autonomous vehicle in Block S212; detecting a first cluster of points in the first 3D point cloud representing a first continuous surface approximating a first plane in Block S220; isolating a first cluster of color pixels in the first 2D color image depicting the first continuous surface in Block S230; projecting the first cluster of color pixels onto the first plane to define a first set of synthetic 3D color points in Block S232; compiling the first cluster of points and the first set of synthetic 3D color points, representing the first continuous surface, into a first 3D frame in Block S232; detecting characteristics of an object, comprising the continuous surface, based on the first cluster of points and the first set of synthetic 3D color points in the first 3D frame in Block S250; based on characteristics of the object, electing a next navigational action in Block S252; and autonomously executing the next navigational action in Block S254.

2.1 Applications

Figure 5:
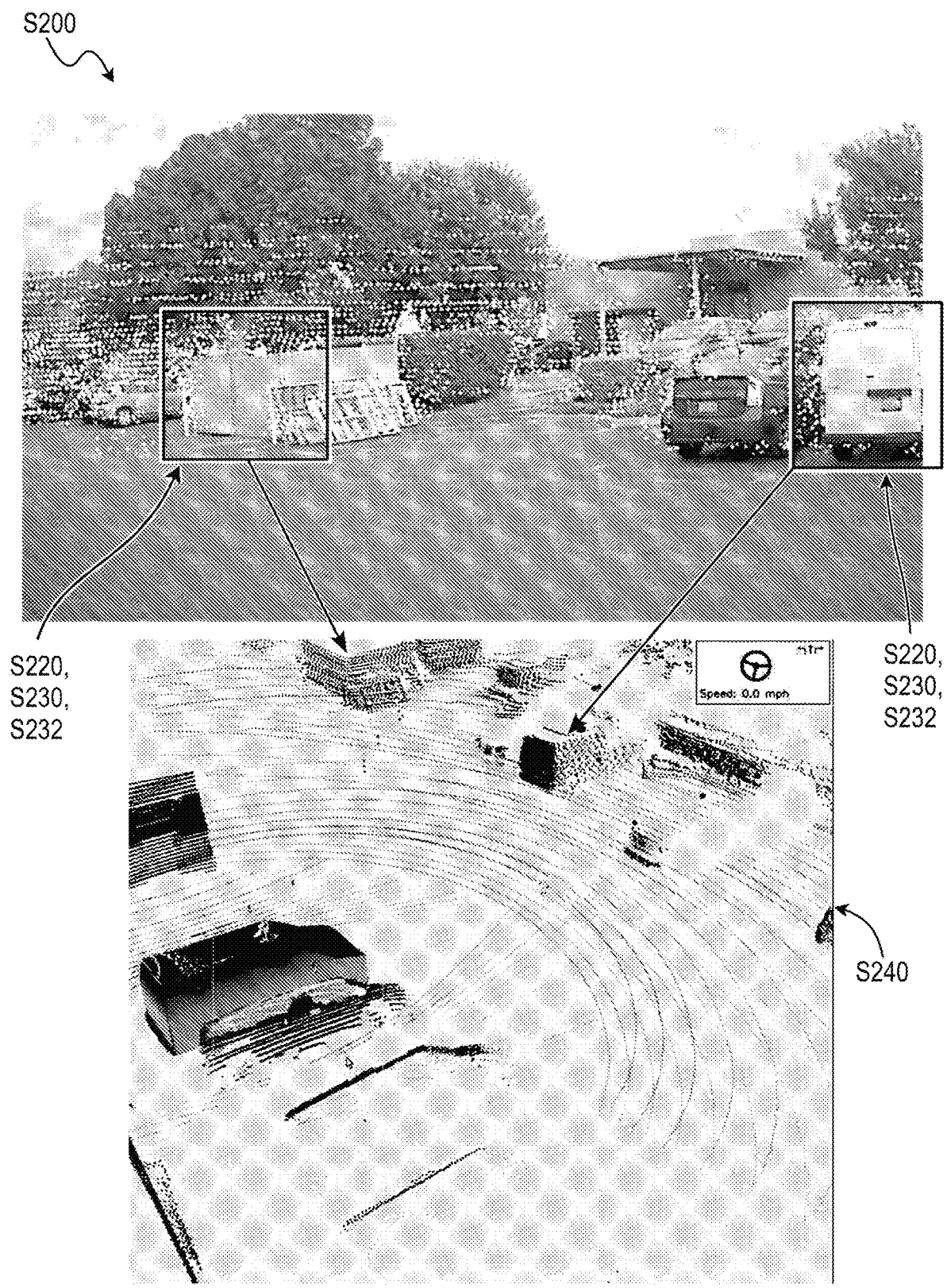
FIG. 5 is a graphical representation of one variation of the second method.
Figure 6:
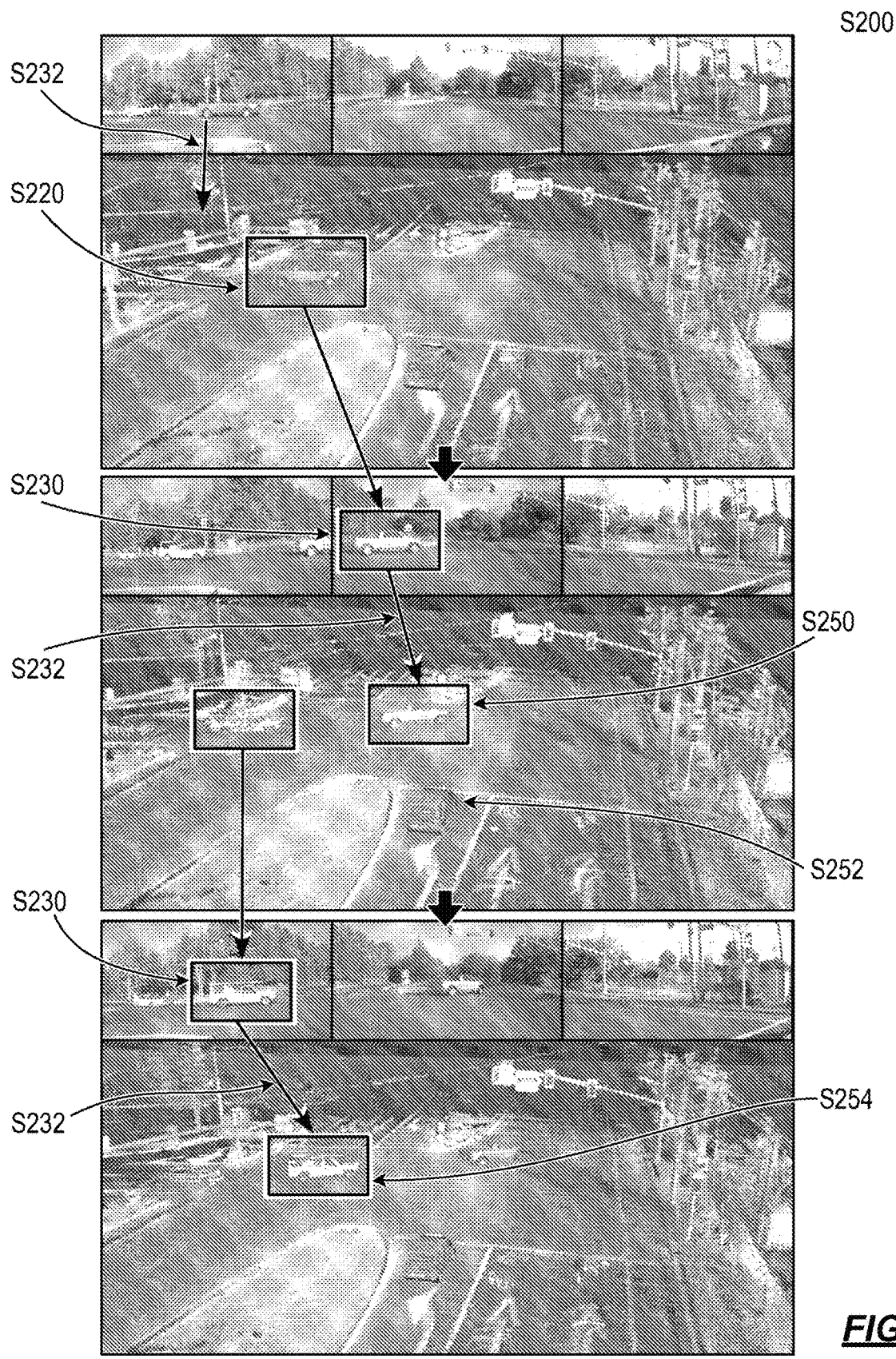
FIG. 6 is a graphical representation of one variation of the second method.

Generally, in the second method S200, the autonomous vehicle can implement methods and techniques similar to the first method S100 to selectively inject 2D pixels—from a 2D color image recorded by the autonomous vehicle—into a concurrent 3D point cloud in order to increase density of visual information depicting select objects or surfaces in the 3D point cloud, as shown in FIGS. 5 and 6. In particular, the autonomous vehicle can: interpret a surface represented by a cluster of points in a 3D point cloud (e.g., a depth map, a 3D LIDAR image); isolate a segment of a concurrent 2D color image that depicts this surface; and inject color pixels from this segment of the 2D color image onto this surface in the 3D point cloud in order to increase density of points depicting this surface in the 3D point cloud. The autonomous vehicle can then render this augmented 3D point cloud on an interior display. The combination of original 3D points and "synthetic 3D color points" thus incorporated into the augmented 3D point cloud rendered on this interior display may enable a rider occupying the autonomous vehicle to better visualize the environment and objects (e.g., other vehicles, pedestrians) around the autonomous vehicle, enable the rider to better comprehend the autonomous vehicle's perception of its environment, and thus improve the rider's comfort and confidence in the autonomous vehicle.

2.1.1 Augmented 3D Point Cloud for Rider

Generally, a 3D point cloud output by a LIDAR sensor or other 3D depth sensor on the autonomous vehicle may contain sparse representations of objects in the field around the autonomous vehicle or otherwise contain limited densities of (e.g., high gap distances between) points corresponding to discrete objects in this field, which may result in difficulty for humans to interpret types and other characteristics of these objects based exclusively on such point-based representations in a 3D point cloud. Therefore, in one example, the autonomous vehicle can implement Blocks of the second method S200 to selectively augment a cluster of points—in a 3D point cloud—depicting a surface on another vehicle in or near the autonomous vehicle's path with color pixels from a region of the concurrent 2D color image depicting this same surface, thereby "filling" gaps between original depth map points in the 3D point cloud with "synthetic 3D color points." By thus leveraging data contained in a concurrent 2D color image to reduce gap distance between points depicting this vehicle in the 3D point cloud and rendering this augmented 3D point cloud on an interior display for a rider, the autonomous vehicle can thus enable the rider to immediately interpret these points as representing another vehicle and maintain confidence that the autonomous vehicle perceives this other vehicle and will avoid collision with this other vehicle.

The autonomous vehicle can similarly augment clusters of points in the 3D point cloud depicting other objects with synthetic 3D color points derived from color pixels in corresponding regions of the concurrent 2D color image. However, by detecting particular objects of interest (e.g., other vehicles, pedestrians, road signs, lane markers) in the field around the autonomous vehicle, selectively augmenting clusters of points in the 3D point cloud representing these objects of interest, and then rendering this augmented 3D point cloud on an interior display, the autonomous vehicle can limit computational load required to merge this 3D point cloud and the 2D color image while also ensuring that objects (likely) of greatest interest to a rider are presented at point densities (more) sufficient for the rider to immediately comprehend. Therefore, the autonomous vehicle can execute Blocks of the second method S200 to selectively merge 3D point cloud and 2D color image data into a 3D representation of the field around the autonomous vehicle with objects depicted at point densities approximately proportional to importance of these objects to a rider inside the autonomous vehicle.

2.1.2 Augmented 3D Point Cloud for Remote Operator and Human Annotator

The autonomous vehicle (or a remote computer system) can implement similar methods and techniques to selectively merge 3D point cloud and 2D color image data into a 3D representation of the field around the autonomous vehicle with objects depicted at point densities approximately proportional to importance of these objects to a remote operate upon assuming remote manual control of the autonomous vehicle, such as in response to a disengagement event at the autonomous vehicle. Similarly, the autonomous vehicle (or the remote computer system) can implement these methods and techniques to selectively merge 3D point cloud and 2D color image data into an augmented 3D point cloud that enables a human annotator to more easily comprehend characteristics of objects depicted in the original 3D point cloud and to label these objects in less time and/or with greater accuracy.

2.1.3 Augmented 3D Point Cloud for Autonomous Vehicle Perception

The autonomous vehicle can: implement similar methods and techniques to selectively merge 3D point cloud data (e.g., from a LIDAR or RADAR sensor, including 3D position, intensity, and/or velocity information) and 2D color image data into an augmented 3D point cloud; and then pass this augmented 3D point cloud into a perception pipeline (e.g., a deep learning or artificial intelligence network) to perceive types, trajectories, and/or other characteristics of objects, as shown in FIG. 4. In particular, by filling gaps between original depth map points depicting a particular object in the 3D point cloud with synthetic 3D color points derived from color pixels depicting this same object in the concurrent 2D color image, the autonomous vehicle can process the augmented 3D point cloud to detect, identify, and characterize the particular object with higher confidence due to higher density of information for this particular object in the augmented 3D point cloud. (By processing this augmented 3D point cloud that includes both original 3D points and synthetic 3D color points, the autonomous vehicle can also avoid both separate analyses of the 2D color image and subsequent combination of separate analyses of the original 3D point cloud and 2D color image, thereby reducing processing time and/or computational load.)

2.1.4 Plane-Based Augmentation

Furthermore, the autonomous vehicle can selectively augment clusters of points—falling on or (very) near a plane—with synthetic 3D color points. In particular, deriving a 3D surface spanning a cluster of pixels in a 3D point cloud and then projecting 2D color pixels from a 2D color image onto this 3D surface may be both computationally intensive and prone to error due to different dimensions of these data and different perspectives of the 3D depth sensor and 2D color camera. Therefore, the autonomous vehicle can: identify a cluster of points that fall on or very near planes in the 3D point cloud; and then selectively augment this cluster of points with 2D data by porting 2D color pixels from the 2D color image onto a 2D (i.e., planar) manifold that (approximately) intersects this cluster of points in the 3D point cloud, thereby preserving 2D color pixel data within a 2D domain, reducing or eliminating need for interpreting complex 3D surfaces in the 3D point cloud, and reducing opportunity for error in position of color data injected into the 3D point cloud. The autonomous vehicle can also implement a simple (e.g., homogenous) transformation matrix to port 2D color pixels into the 3D point cloud—such as based on a known or calibrated offset between the 3D depth sensor and the 2D color camera—thereby limiting computational load necessary to merge these data.

Additionally or alternatively, the autonomous vehicle can implement Blocks of the second method S200 to augment clusters of points depicting static objects in a 3D point cloud with data from a concurrent 2D color image, such as selectively for static objects containing iconography or other content of interest, including billboards, road signs, license plates, and building facades.

The second method S200 is described herein as executed in real-time by the autonomous vehicle to fuse data from a 2D color image with a concurrent 3D point cloud recorded by sensors on the autonomous vehicle. However, the autonomous vehicle can also repeat this process regularly over time, such as at a rate of 20 Hz or once per 3D point cloud generated by a 3D depth sensor. The autonomous vehicle can also execute Blocks of the second method S200 to fuse color data from multiple 2D color images with a single 3D depth map. The autonomous vehicle can also combine multiple concurrent 3D depth maps generated by multiple 3D depth sensors on the autonomous vehicle into one composite 3D depth map and then fuse color data from one or more concurrent 2D color images with this composite 3D depth map according to the second method S200. Additionally or alternatively, a remote computer system can access (raw) 2D color images and 3D point clouds recorded previously by an autonomous vehicle and then implement Blocks of the second method S200 to fuse these data, such as in preparation for remote manual or automated annotation.

2.2 Data Collection

Blocks S210 and S220 of second method S200 recite: accessing a first 2D color image recorded at a first time via a 2D color camera arranged on an autonomous vehicle; and accessing a first 3D point cloud recorded at approximately the first time via a 3D depth sensor arranged on the autonomous vehicle in Block S212, the 3D depth sensor and the 2D color camera defining intersecting fields of view and facing outwardly from the autonomous vehicle. Generally, in Blocks S210 and S212, the autonomous vehicle can access color and 3D depth data recorded—at similar times—by sensors on the autonomous vehicle.

In one implementation, the autonomous vehicle includes a set of spinning LIDAR sensors (i.e., a "3D depth sensor) arranged on the autonomous vehicle, such as one LIDAR sensor mounted at each corner of the autonomous vehicle or a set of LIDAR sensors integrated into a roof rack mounted to the roof of the autonomous vehicle. Each LIDAR sensor can output one 3D LIDAR image—such as in the form of a "3D point cloud" representing distances between the LIDAR sensor and external surfaces within the field of view of the LIDAR sensor—per rotation of the LIDAR sensor (i.e., once per scan cycle). For example, each LIDAR sensor can include a stack of pixels (e.g., 16 or 32 pixels arranged in a linear vertical array) mounted on a motorized rotary table; during a scan cycle, the LIDAR sensor can rotate the stack of pixels and record a distance value from each pixel in the stack at each of many (e.g., 1000 or 4500) points per rotation to produce a LIDAR image containing a 3D point cloud characterized by a relatively high azimuthal resolution (e.g., 0.3° or 0.08°) and a lower vertical resolution (e.g., 1.7° or 0.8°). Furthermore, because the LIDAR sensor sweeps a column of pixels about its rotational axis, the LIDAR sensor may represent an object near the autonomous vehicle and in the field of view of the LIDAR sensor as rows of points in a LIDAR image. In particular, a large object nearer the autonomous vehicle may be represented by a larger number of rows, each containing a larger number of points, in this LIDAR image; and a smaller object further from the autonomous vehicle may be represented by a smaller number of rows—each containing fewer points—in this LIDAR image.

The autonomous vehicle can also include a suite of 2D color cameras, such as grayscale or RGB cameras: arranged on the roof of the autonomous vehicle; located in multiple orientations about the autonomous vehicle (e.g., facing the front, front corners, sides, and rear of the autonomous vehicle); and each defining a field of view that overlaps the field of view of at least one LIDAR sensor on the autonomous vehicle.

During operation, 3D depth sensors on the autonomous vehicle can regularly output 3D point clouds, such as at a rate of 10 Hz. Cameras on the autonomous vehicle can similarly regularly output 2D color images, such as at a rate of 24 Hz. During a scan cycle, the autonomous vehicle can thus: select a last 3D point cloud output by a 3D depth sensor in Block S210; and select a 2D color image recently output by a camera—defining a field of view intersecting the field of view of the 3D depth sensor—at a time nearest the record time of the 3D point cloud in Block S212.

However, the autonomous vehicle can include one or more 3D depth sensors and 2D color cameras of any other type or configuration.

2.3 Object Detection and Perception

The autonomous vehicle can then implement baseline perception and/or deep learning perception techniques to detect objects in the field around the autonomous vehicle from the 3D point cloud.

In one implementation, the autonomous vehicle executes a baseline perception pipeline to derive object perception data from the 3D point cloud, such as including predictions of types and relative velocities of objects represented by points in the 3D point cloud. The autonomous vehicle concurrently implements a deep learning pipeline to derive higher-resolution object perception data from the 3D point cloud, such as including classification of objects and predictions for dimensions (e.g., lengths) of objects depicted at lower point densities or partially obscured in the 3D point cloud. Therefore, in this implementation, the autonomous vehicle implements both: baseline perception techniques to determine whether a cluster of points in the 3D point cloud represents a vehicle element or another type of object (e.g., a "soft classification" to predict whether this cluster of LIDAR points represents a vehicle element); and deep learning perception techniques to predict a type and other more specific characteristics of a vehicle element (e.g., regression techniques to predict a type of the vehicle, a length of the vehicle, and a vehicle dynamics model most representative of the vehicle element).

For example, the autonomous vehicle can implement baseline perception to predict whether a cluster of points in a 3D point cloud recorded during a current scan cycle represents a road vehicle, a pedestrian, a road sign, a shrub or tree, a building façade, a trashcan, or other discrete object. Upon determining that a cluster of points corresponds to one discrete object, the autonomous vehicle can link (or "group") these points and implement 3D object tracking techniques to track this cluster of points over subsequent 3D point clouds recorded by the 3D depth sensor. The autonomous vehicle can also implement deep learning perception in parallel with baseline perception to verify objects detected by the baseline perception pipeline and to derive additional characteristics of the object, such as an orientation, type, and motion characteristics of the object. The autonomous vehicle can then select or generate a motion model for the object based on characteristics extracted by the deep learning pipeline and then estimate a trajectory and/or predict future locations of the object based on this motion model.

By tracking clusters of points corresponding to discrete objects in the field around the autonomous vehicle, the autonomous vehicle can also distinguish clusters of points that depict static objects (e.g., road signs, lane markers, buildings, telephone poles, curb, trashcans, trees, shrubs) from clusters of points that depict dynamic objects (other vehicles, motorcycles, pedestrians, cyclists). (Additionally or alternatively, the autonomous vehicle can match clusters of points in the 3D point cloud to static objects labeled in a localization map to identify immutable objects in the field and to distinguish mutable objects—and therefore possibly dynamic objects—from these immutable objects.) The autonomous vehicle can then label or distinguish clusters of points in the 3D point cloud that correspond to dynamic objects from clusters of points in the 3D point cloud that correspond to static objects. The autonomous vehicle can then selectively: augment clusters of points that correspond to dynamic objects with data from the concurrent 2D color image; and augment clusters of points that correspond to static objects with data from the preceding 3D point clouds.

However, the autonomous vehicle can implement any other method or technique to detect and track clusters of pixels representing discrete objects in the current 3D point cloud during the current scan cycle.

The autonomous vehicle can then: implement a local motion planner to elect a next navigational action based on perception and characteristics of these objects in the field around the autonomous vehicle; autonomously execute this next navigational action; and repeat this process for 3D point clouds recorded during each subsequent scan cycle at the autonomous vehicle as the autonomous vehicle autonomously navigates to its assigned destination.

2.4 Plane Detection and Surface Selection

Block S220 of second method S200 recites detecting a first cluster of points in the first 3D point cloud representing a first continuous surface approximating a first plane. Generally, after recording the 3D point cloud during the current scan cycle, the autonomous vehicle can implement plane detection or plane fitting techniques in order to isolate clusters of points that fall on (or very near) a plane and may therefore represent an approximately-planar surface in the field of view of the 3D depth sensor during this scan cycle.

In one implementation shown in FIG. 4, the autonomous vehicle isolates multiple groups of points in the 3D point cloud that correspond to dynamic (i.e., "moving") objects in the field around the autonomous vehicle, as described above. For each group of points in this set, the autonomous vehicle can then: de-noise this group of points to discard outliers; and implement plane detection or plane fitting techniques to calculate best-fit planes for subsets (of minimum size) of points in this filtered group. More specifically, for a filtered group of points, the autonomous vehicle can: calculate a set of planes that each span the largest quantity of points with the smallest error in this group; and then cluster subsets of points in this group that fall approximately on the same planes. For example, for a group of points representing a semi-trailer located to the right and ahead of the autonomous vehicle, the autonomous vehicle can calculate: a first plane that spans a first cluster of points—in this group—representing the left slab side of the semi-trailer; and a second plane that spans a second cluster of points—in this same group of points—representing the rear of the semi-trailer. The autonomous vehicle can implement similar methods and techniques to calculate planes that approximately intersect clusters of points that represent faces of other dynamic objects in the field, such as sides of passenger vehicles or torsos of pedestrians.

The autonomous vehicle can implement similar methods and techniques to calculate planes for clusters of points depicting surfaces of static objects in the 3D point cloud, such as clusters of points depicting road signs, building facades, sides of parked vehicles, and the road surface in front of the autonomous vehicle (e.g., up to a maximum distance of 20 meters from the autonomous vehicle).

In this implementation, the autonomous vehicle can also set error limits for calculating best-fit planes for points in an object. For example, the autonomous vehicle can set higher permissible error limits for smaller objects and/or for objects characterized by lower point densities in the 3D point cloud; and vice versa. In this example, the autonomous vehicle can thus: calculate a first plane for a first cluster of points representing the front of a pedestrian's torso with high permitted error; calculate a second plane for a second cluster of points representing a rear of a passenger vehicle with moderate permitted error; and calculate a third plane for a third cluster of points representing a large slab side of a semi-trailer with low permitted error in the current 3D point cloud. The autonomous vehicle can then: discard planes that exhibit error greater than their permissible error limits; and selectively augment planes—in the 3D point cloud—that exhibit less than their permissible error limits with color data from the concurrent 2D color image.

The autonomous vehicle can therefore calculate or otherwise identify multiple (or many) planes that approximate clusters of points in the 3D point cloud, wherein each plane and point cluster pair depicts a surface of an object in the field around the autonomous vehicle. However, the autonomous vehicle can implement any other method or technique to calculate or identify these planes.

2.5 Color Pixel Isolation

Block S230 of second method S200 recites isolating a first cluster of color pixels in the first 2D color image depicting the first continuous surface; and Block S232 of the second method S200 recites projecting the first cluster of color pixels onto the first plane to define a first set of synthetic 3D color points in the first 3D point cloud. Generally, the autonomous vehicle can select a particular plane and corresponding cluster of points in the 3D point cloud to augment with color data from the concurrent 2D color image, such as based on a rank or priority for the plane, cluster of points, or corresponding object as described below. The autonomous vehicle can then: retrieve color data from the corresponding region of the concurrent 2D color image in Block S230; and project this color data into the 3D point cloud to generate an "augmented 3D point cloud" in Block S232.

In one implementation, the autonomous vehicle: calculates a 2D boundary on the plane that encompasses this cluster of points in the 3D point cloud. The autonomous vehicle can then leverage a known position of the color camera relative to the 3D depth sensor—such as stored in an alignment transform recently calculated by the autonomous vehicle—to project the 2D boundary around this cluster of pixels onto the concurrent 2D color image. The autonomous vehicle can then project color pixels contained within this projected boundary in the 2D color image onto the plane in the 3D point cloud and within the 2D boundary thus defined on this plane. The autonomous vehicle can store these projected color pixels as synthetic 3D color points in the 3D point cloud (now the "augmented 3D point cloud").

In a similar implementation, after projecting the 2D boundary around this cluster of pixels in the 3D point cloud onto the concurrent 2D color image, the autonomous vehicle can isolate a true boundary of a surface corresponding to this cluster of points by implementing edge detection or other computer vision techniques to detect an edge nearest the projected 2D boundary. The autonomous vehicle can then project color pixels contained from within this true boundary in the 2D color image back onto the plane in the 3D point cloud—such as based on an inverse of the alignment transform to define a set of synthetic 3D color points in the 3D point cloud. The autonomous vehicle can then store these projected color pixels as synthetic 3D color points in the 3D point cloud.

(In one variation, rather than import color pixels from the 2D color image into the 3D point cloud, the autonomous vehicle can: initialize a 3D frame with points from the current 3D point cloud, such as a de-noised subset of points from the original 3D point cloud; and augment this 3D frame with a set of synthetic 3D color points depicting the first continuous surface on the dynamic object. The autonomous vehicle can then process and/or render this 3D frame—rather than the augmented 3D point cloud—as described below.)

However, the autonomous vehicle can implement any other method or technique to isolate color pixels in the 2D color image that correspond to the surface represented by the cluster of pixels and approximately by the corresponding plane in the 3D point cloud in Block S230 and to port these color pixels into the 3D point cloud accordingly in Block S232.

2.5.1 Multiple Augmented Surfaces per Object

The autonomous vehicle can implement similar methods and techniques to augment clusters of points—representing different approximately-planar surfaces on one object—in the 3D point cloud with color data from corresponding regions of the concurrent 2D color image, as shown in FIGS. 4 and 6.

For example, the autonomous vehicle can: select a first cluster of points —in the 3D point cloud—representing a first continuous surface corresponding to a first side of an object (e.g., a side of a semi-trailer) proximal the path of the autonomous vehicle in Block S220; calculate a first plane that approximately intersects the first cluster of points with minimum error; isolate a first cluster of color pixels in the first 2D color image depicting the first continuous surface on the object in Block S230; and then project the first cluster of color pixels onto the first plane to define a first set of synthetic 3D color points—in the 3D point cloud—that cooperate with the first set of synthetic 3D color points to depict the first continuous surface on the object in Block S232. Simultaneously, the autonomous vehicle can: identify a second cluster of points—in the 3D point cloud—representing a second continuous surface corresponding to a second side of the object (e.g., a rear of the semi-trailer) in Block S220; calculate a second plane that approximately intersects the second cluster of points with minimum error; isolate a second cluster of color pixels in the second 2D color image depicting the second continuous surface on the object in Block S230; and then project the second cluster of color pixels onto the second plane to define a second set of synthetic 3D color points—in the 3D point cloud—that cooperate with the second set of synthetic 3D color points to depict the second continuous surface on the object in Block S232.

The autonomous vehicle can thus augment multiple discontinuous surfaces on the same object represented by points in the 3D point cloud with color data from the concurrent 2D color image.

Alternatively, the autonomous vehicle can prioritize augmenting one surface on an object, such as a largest, approximately-planar surface on the object depicted in the 3D point cloud. For example, the autonomous vehicle can: isolate a constellation of points depicting a dynamic object in the current 3D point cloud; interpret a set of surfaces on the dynamic object represented by the constellation of points; and select a cluster of points—in this constellation of points—that span or define a largest approximately-planar surface, in the set of surfaces, on the dynamic object.

2.6 Object Filling Prioritization:

The autonomous vehicle can similarly execute Blocks of the second method S200 to augment surfaces on multiple distinct objects represented by points in the 3D point cloud with color data from the concurrent 2D color image, as shown in FIG. 4. For example, the autonomous vehicle can augment multiple clusters of points—in one 3D point cloud—representing surfaces on various discrete vehicles, pedestrians, road signs, and/or building façades with color data from the current 2D color image (or with color data from multiple concurrent 2D color images recorded by a set of color cameras arranged on the autonomous vehicle).

However, the autonomous vehicle can also prioritize objects depicted in the 3D point cloud and then selectively augment corresponding clusters of points with color data from the concurrent 2D color image.

2.6.1 Dynamic Objects

In one implementation, the autonomous vehicle selectively augments clusters of points representing surfaces on dynamic (i.e., moving) objects in the field near the autonomous vehicle, shown in FIGS. 4 and 6.

For example, the autonomous vehicle can implement 3D object tracking techniques to detect a dynamic object (e.g., another vehicle, a pedestrian)—in the field near the autonomous vehicle—located near the autonomous vehicle's current path and to detect a static object in the field in a sequence of 3D point clouds recorded by the 3D depth sensor. The autonomous vehicle can then: prioritize augmentation of the dynamic object in the current 3D point cloud with color data from the concurrent 2D color image—over augmentation of the static object—because the static object may be augmentable (with less computational load) with 3D data from past 3D point cloud data; and select the dynamic object for selective augmentation with 2D color data accordingly. The autonomous vehicle can then: select a cluster of points, in the current 3D point cloud, representing an approximately-planar continuous surface on the dynamic object in Block S220; isolate a cluster of color pixels in the concurrent 2D color image depicting this continuous surface on the dynamic object in Block S230; and then project the cluster of color pixels into the current 3D point cloud, thereby augmenting the current 3D point cloud with a set of synthetic 3D color points depicting the continuous surface on the dynamic object.

Therefore, in this implementation, the autonomous vehicle can prioritize augmentation of clusters of points representing other vehicles, pedestrians, and cyclists over road signs, buildings facades, and other static or immutable objects near the autonomous vehicle.

2.6.2 Objects Near Path of Autonomous Vehicle

In a similar implementation, the autonomous vehicle can prioritize augmentation of clusters of points depicting objects—in the 3D point cloud—near the autonomous vehicle's path with color data from the concurrent 2D color image.

For example, the autonomous vehicle can implement 3D object tracking techniques to detect a first dynamic object—in the field near the autonomous vehicle—moving toward the autonomous vehicle's path and to detect a second dynamic object—in the field—located remotely from the autonomous vehicle's path in a sequence of 3D point clouds recorded by the 3D depth sensor. The autonomous vehicle can then prioritize augmentation of the first dynamic object in the current 3D point cloud with color data from the concurrent 2D color image—over augmentation of the second dynamic object—such as to accommodate a rider viewing this augmented 3D point cloud who may be more interested in or concerned with the autonomous vehicle's perception of objects in the path of the autonomous vehicle than objects remote from the autonomous vehicle's path. The autonomous vehicle can then implement methods and techniques described above to selectively augment a cluster of points—representing a surface on the first dynamic object—in the 3D point cloud with color data from the concurrent 2D color image.

The autonomous vehicle can implement similar methods and techniques to prioritize augmentation of: objects at closer distances to the autonomous vehicle; objects moving at greater absolute speeds; objects moving at greater speeds relative to the autonomous vehicle; or objects moving toward the autonomous vehicle or the autonomous vehicle's path.

The autonomous vehicle can similarly prioritize augmentation of smaller objects over larger objects. For example, because smaller objects may be depicted with fewer total points in the original 3D point cloud, these smaller objects may be more difficult for a rider in the autonomous vehicle to perceive when this 3D point cloud is rendered on the interior display of the autonomous vehicle. (This smaller number of points in the 3D point cloud also corresponds to less available data for the autonomous vehicle to perceive this smaller object and may therefore result in the autonomous vehicle identifying this object with less confidence.) Therefore, the autonomous vehicle can selectively augment clusters of points—depicting small objects, such as pedestrians and trashcans, in the 3D point cloud—with color data from the concurrent 3D point cloud.

2.6.3 Point Density

Similarly, the autonomous vehicle can prioritize augmentation of clusters of points with lower point densities. As in the foregoing example, objects represented in the 3D point cloud with lower densities of points may be more difficult for a rider in the autonomous vehicle to perceive (and yield lower-confidence perception by the autonomous vehicle); the autonomous vehicle can therefore selectively augment these clusters of points in the 3D point cloud with color data from the concurrent 2D color image.

In one implementation, that autonomous vehicle identifies a set of clusters of points in the current 3D point cloud, wherein each cluster of points in the set of clusters of points represents a discrete surface in the field around the autonomous vehicle and contains points that fall approximately on a plane. The autonomous vehicle then selects a particular cluster of points—in this set of clusters of points—that is characterized by a density of points less than a threshold point density and then augments this particular cluster of points with color data from the concurrent 2D color image. In this example, the autonomous vehicle can: extract a distance from the autonomous vehicle to the surface represented by this particular cluster of points in the 3D point cloud; and then calculate the threshold point density inversely proportional to this distance from the autonomous vehicle to the first continuous surface. Alternatively, the autonomous vehicle can implement a fixed threshold point density for all objects in the field and then selectively augment clusters of points—representing surfaces on dynamic objects in the field—that exhibit less than this threshold point density.

However, the autonomous vehicle can implement any other schema to select particular clusters of points in the 3D point cloud for augmentation with color data for the concurrent 2D color image.

2.7 Static Object Augmentation With Past 3D Depth Data

In the foregoing implementations, the autonomous vehicle can therefore augment a cluster of points representing a dynamic object in the current 3D point cloud with synthetic color pixels generated from 2D color pixels depicting the dynamic object in the concurrent 2D color image, thereby increasing density of points depicting this dynamic object in the augmented 3D point cloud. In one variation of the method shown in FIGS. 4 and 5, the autonomous vehicle can also aggregate 3D points depicting a static object—across multiple consecutive and preceding 3D point clouds—and inject these aggregate points into the current 3D point cloud in Block S260 in order to achieve greater density of points depicting the static object in the 3D point cloud but with less computational load than merging color and depth data for the dynamic object.

In particular, the autonomous vehicle can: record a first 3D point cloud at a first time; isolate a first set of points representing a static object in the first 3D point cloud; record a second 3D point cloud at a second time; track a change in position of the autonomous vehicle relative to the static object from the first time to the second time; and then leverage identification of the object as static to project the first set of points representing the static object directly into the second 3D point cloud based on the known change in position of the autonomous vehicle from the first time to the second time. The autonomous vehicle can thus directly combine points depicting this static object over multiple 3D point clouds without converting these points between 2D and 3D domains or otherwise processing these points, thereby limiting computational load required to increase density of points depicting this static object in the later 3D point cloud. The autonomous vehicle can repeat this process over multiple scan cycles to inject points from multiple previous 3D point clouds into the current 3D point cloud such that the current 3D point cloud contains a very high density of points depicting static objects in the field nearby.

For example, the autonomous vehicle can: detect a static object in a preceding sequence of 3D point clouds; isolate a second cluster of points—in the current 3D point cloud—that represents this static object; aggregate groups of static points representing the static object in the preceding sequence of 3D point clouds; and project these groups of static points into the current 3D point cloud based on changes in absolute position of the autonomous vehicle between the time that the current 3D point cloud was recorded and times that these preceding 3D point clouds were recorded by the autonomous vehicle.

The autonomous vehicle can thus: augment clusters of points representing dynamic objects in the 3D point cloud with synthetic 3D color points derived from the concurrent 2D color image; and augment clusters of points representing static objects in the 3D point cloud with points derived from the preceding 3D point clouds.

2.8 3D Point Recoloring from Synthetic 3D Color Points

In one variation shown in FIG. 4, the autonomous vehicle can also color the cluster of points with color values of adjacent synthetic 3D color points projected into the 3D point cloud. In one implementation, once the autonomous vehicle populates a plane approximating a cluster of points in the 3D point cloud with a set of synthetic 3D color points as described above, the autonomous vehicle can interpolate color values of points in the cluster based on color values stored in these synthetic 3D color points. For example, for each original 3D point in the cluster, the autonomous vehicle can: write a color value from the nearest synthetic 3D color point to the original 3D point; write an average color value of nearest synthetic 3D color points (e.g., the three nearest synthetic 3D color points) to the original 3D point; linearly interpolate a color value of the original 3D point from a short row or column synthetic 3D color points on the corresponding plane nearby; or radially interpolate a color value of the original 3D point from synthetic 3D color points surrounding the point.

The autonomous vehicle can therefore selectively color a cluster of points—depicting an approximately-planar surface on a dynamic object in the 3D point cloud—based on color data derived from the concurrent 2D color image. The autonomous vehicle can implement similar methods and techniques to selectively augment and color a cluster of points—depicting an approximately-planar surface on a static object of interest in the 3D point cloud (e.g., a billboard, road sign, a building façade)—based on color data derived from the concurrent 2D color image.

The autonomous vehicle can then render this 3D point cloud containing both: clusters of points depicting dynamic (and static) objects of interest shown in color and augmented with synthetic 3D color points; and with monochromatic points depicting other lower-priority (dynamic and static) objects and surfaces in the field.

2.9 3D Point Recoloring from 2D Color Pixels

Additionally or alternatively, the autonomous vehicle can port color values directly from color pixels in the 2D color image onto points in the 3D point cloud in Block S270 by deriving correspondence between a point in the 3D point cloud and a pixel in the first 2D color image and then interpolating a color value of the point directly based on the color values stored in the color pixels, as shown in FIGS. 4 and 5. For example, the autonomous vehicle can access an alignment transform for the color camera and 3D depth sensor and virtually locate the 2D color image relative to the 3D point cloud based on the alignment transform and as described above. For each point in the 3D point cloud, the autonomous vehicle can then: implement ray tracing techniques to project a ray from the origin of the 3D point cloud through the point, as described above; isolate a cluster of pixels in the 2D color image that fall nearest the ray; implement linear or radial interpolation techniques to derive a color value of the point from this cluster of pixels; and then write this color value to the point. The autonomous vehicle can repeat this process to assign color values to all other points in the 3D point cloud. Alternatively, the autonomous vehicle can implement this process to selectively assign color values to other points representing objects of interest in the 3D point cloud. Yet alternatively, the autonomous vehicle can: implement this process to assign color values to a first subset of points in the 3D point cloud, such as 10% of points uniformly distributed throughout the 3D point cloud; and then interpolate color values of other points in the 3D point cloud from this first subset of colored points.

In a similar implementation, the autonomous vehicle: selectively colors points in clusters augmented with synthetic 3D color points, as described above; and selectively ports color values directly from color pixels in the 2D color image onto remaining points in the 3D point cloud. In particular, coloring points in an augmented cluster with synthetic 3D color points may result in fewer aberrations or errors between color values mapped to the original depth map points in the 3D point cloud and color values of adjacent synthetic 3D color points injected into the 3D point cloud but may require relatively greater computational load per pixel to complete this process. The autonomous vehicle can also color other clusters of points in the 3D point cloud not located near synthetic 3D color points by directly porting color values from the 2D color image onto these other clusters of points in order to achieve a full-color 3D point cloud with relatively less computational load per pixel.

However, the autonomous vehicle can implement any other method or technique to port color data from the 2D color image into the 3D point cloud.

2.10 Variation: Color Space to 3D Space

In one variation, rather that identify objects for augmentation in the 3D point cloud, the autonomous vehicle initially isolates clusters of color pixels depicting discrete objects in the concurrent 2D color image and then projects these pixels into the 3D point cloud. For example, the autonomous vehicle can: segment the 2D color image to isolate clusters of color pixels that depict discrete objects; derive boundaries around these objects in 2D color space; select an object in the 2D color image (e.g., based on priority, such as described above); project the boundary of the object from 2D color space into the 3D point cloud based on a stored alignment transform for the 2D color camera and the 3D depth sensor; isolate a group of points bounded by this projected boundary; calculate a set of (i.e., one or more) planes that approximate clusters of points in this group; and then implement the foregoing methods and techniques to augment each of these clusters of points with synthetic 3D color points based on color pixels that depict this object in the 2D color image.

2.11 Variation: 3D Surface in 3D Point Cloud

As described above, the autonomous vehicle can isolate a set of planes that approximate surfaces—such as down to a minimum area—of an object depicted in a group of points in the 3D point cloud and then selectively augment these planes in the 3D point cloud with color data from the concurrent 2D color image. In particular, the autonomous vehicle can augment many planar facets—that approximate an object in the 3D point cloud—with synthetic 3D color points based on the 2D color image; these synthetic 3D color points may thus approximate a non-planar or compound surface on the object.

Alternatively, the autonomous vehicle can extract a non-planar or compound surface directly from a group of points depicting an object in the 3D point cloud and then implement methods and techniques described above to isolate a group of color pixels that depict this surface in the concurrent 2D color image and to project this group of color pixels onto the non-planar or compound surface in the 3D point cloud.

2.12 Display: Rider

Block S240 of second method S200 recites rendering points in the first 3D point cloud and the first set of synthetic 3D color points on a display. Generally, in Block S240, the autonomous vehicle can render the augmented 3D point cloud (i.e., the current 3D point cloud and augmented with a set of synthetic 3D color points) on a display arranged inside the autonomous vehicle in near real-time, as described above in the first method S100.

As described above, the autonomous vehicle can selectively augment dynamic (and static) objects of interest in the 3D point cloud with synthetic 3D color points such that these objects are rendered at a point density greater than other lower-priority objects. For example, the autonomous vehicle can thus present its surrounding field to a rider with objects depicted at a resolution proportional to importance, thereby enabling the rider to build confidence in the autonomous vehicle's perception of its environment while limiting computational load necessary to generate and render this representation of the field. In this example, the autonomous vehicle can thus augment nearby vehicles, pedestrians, and road signs depicted in the 3D point cloud with synthetic 3D color points derived from the concurrent 2D color image but depict other objects—such as trees buildings, the road surface, at other vehicles at long distances from the autonomous vehicle at the native resolution of the 3D depth sensor.

The autonomous vehicle can repeat this process to selectively augment each subsequent 3D point cloud recorded by the autonomous vehicle.

2.12.1 Image Enhancement

In one variation, the autonomous vehicle enhances an object depicted in the augmented 3D point cloud rendered on the interior display—with digital content. In one example, the autonomous vehicle: detects a cluster of points in the current 3D point cloud that represent a roadside billboard in Block S220; isolates a cluster of pixels in the concurrent 2D color image that depict this billboard in Block S230; augments the current 3D point cloud with a set of synthetic 3D color points depicting the roadside billboard in Block S232; and writes color values from nearby synthetic 3D color points to original depth map points in this cluster such that the 3D point cloud depicts the billboard in color and in greater resolution (i.e., greater point density). In this example, the autonomous vehicle can then implement computer vision techniques to extract iconography (e.g., text, icons, characters, image features) on the roadside billboard from the 2D color image (i.e., from a cluster of color pixels) or from the augmented 3D point cloud (i.e., the cluster of original depth map points and the set of synthetic 3D color points). The autonomous vehicle can then: retrieve electronic content related to the roadside billboard based on these iconography; render the augmented 3D point cloud on the interior display; and overlay the electronic content related to the roadside billboard over the first 3D point cloud and the first set of synthetic 3D color points rendered on the display. In this example, the autonomous vehicle can: retrieve a hyperlink for an advertiser or product advertised on the billboard from a remote database or computer network; highlight the billboard in the augmented 3D point cloud rendered on the interior display, such as with a virtual colored border or an animated tag; and then open a browser window navigated to this hyperlink on the interior display responsive to the rider selecting the billboard or animated tag. Similarly, if the autonomous vehicle determines that the billboard is an advertisement for a local business (e.g., a coffee shop, a retail store) based on iconography detected on the billboard, the autonomous vehicle can render a prompt—to reroute the autonomous vehicle to this local business—over the billboard depicted in the augmented 3D on the interior display; accordingly, the autonomous vehicle can update its navigation path and reroute to a known location of this local business responsive to the user selecting this prompt on the interior display. Alternatively, the autonomous vehicle can: retrieve a graphical augmented reality animation for visual content detected on the billboard from a remote database or computer network; and then render this graphical augmented reality animation over the billboard depicted in the augmented 3D on the interior display.

The autonomous vehicle can implement similar methods and techniques to enhance iconography detected on building facades, other vehicles (e.g., advertisements or logos on semi-trailers), and road signs depicted in 3D point clouds rendered on the interior display. However, the autonomous vehicle can selectively enhance a 3D point cloud with external content in any other way before rendering this enhanced 3D point cloud on the interior display inside the autonomous vehicle.

2.12.2 Display: Remote Operator

Additionally or alternatively, the autonomous vehicle can serve the augmented 3D point cloud to a remote operator—such as when the autonomous vehicle disengages from autonomous operation—in order to enable the remote operator perceive the scene around the autonomous vehicle in less time and/or with greater accuracy and to assist the autonomous vehicle in electing a next navigational action accordingly.

In this implementation, the autonomous vehicle can execute Blocks of second method S200 to selectively augment objects depicted in the current 3D point cloud responsive to a perception failure of the autonomous vehicle. For example, if the autonomous vehicle disengaged from autonomous operation due to failure to perceive a particular object in the current 3D point cloud, the autonomous vehicle can: execute the foregoing methods and techniques to selectively augment a cluster of points depicting this particular object in the 3D point cloud with color data from the concurrent 2D color image; and then serve a request for remote assistance and all or a portion of this augmented 3D point cloud to a remote operator portal. The remote operator portal can then render this augmented 3D point cloud, including the particular object depicted at enhanced resolution. A remote operator at this remote operate portal may then review this augmented 3D point cloud to perceive the scene around the autonomous vehicle —including the particular object thus shown in more detail—before returning a command or navigational action to the autonomous vehicle.

Therefore, in this implementation, the autonomous vehicle can execute Blocks of the second method S200 to selectively augment a current 3D point cloud with color data before uploading this augmented 3D point cloud to a remote operator portal of a remote operator selected to remotely assist the autonomous vehicle.

2.12.3 Display: Human Annotator

The autonomous vehicle or a remote computer system can similarly selectively augment a 3D point cloud with color data from a concurrent 2D color image before this augmented 3D point cloud is served to and rendered on a local machine for manual annotation by a human annotator.

2.13 Perception with Augmented 3D Depth Image

In one variation of the second method S200, the autonomous vehicle selectively augments a cluster of points—in the current 3D point cloud—that represents a surface on an object that the autonomous vehicle identified with lower confidence in the current or preceding 3D point cloud. Once the autonomous vehicle has augmented this cluster of points with color data from the concurrent 2D color image, the autonomous vehicle can reprocess all of the augmented 3D point cloud or a segment of the augmented 3D point cloud depicting this object in order to identify and/or characterize the object with greater confidence. In particular, if the autonomous vehicle fails to perceive an object in the field nearby with sufficient confidence based on data contained in an original 3D point cloud, the autonomous vehicle can selectively augment a region of the 3D point cloud depicting this object with 2D color image data and then reprocess this augmented region of the 3D point cloud in order to identify and characterize the object with greater confidence in Block S250. The autonomous vehicle can then elect a next navigational action in Block S252 based on characteristics of the object thus derived from the augmented 3D point cloud and autonomously execute this next navigational action in Block S254.

In one implementation, after recording a 3D point cloud and a concurrent color image during a current scan cycle, the autonomous vehicle passes the original 3D point cloud through a perception pipeline to identify characteristics of objects thus represented by points in the 3D point cloud. Then, if an initial confidence for characteristics of a particular object represented in the 3D point cloud is less than a threshold confidence, the autonomous vehicle can: isolate a cluster of color pixels in the concurrent color image that correspond to a cluster of points representing this particular object in the 3D point cloud; augment this cluster of points with synthetic 3D color points generated based on this cluster of color pixels; and then pass the first 3D point cloud—now augmented with the synthetic 3D color points—back through the perception pipeline to identify characteristics of the particular object with a revised (e.g., greater) confidence in Block S250. The autonomous vehicle can then elect and execute a next navigational action accordingly in Blocks S252 and S254.

2.14 Other Domains

In one variation, the autonomous vehicle can implement similar methods and techniques to selectively augment a current 3D point cloud with data in other domains and recorded by other sensors on the autonomous vehicle.

For example, the autonomous vehicle can include a RADAR sensor arranged on the front of and facing outwardly from the front of the autonomous vehicle, configured to detect surfaces in its field of view (i.e., ahead of the autonomous vehicle), and configured to output a list of these surfaces and their positions once per scan cycle. For example, the RADAR sensor can define an approximately 2D field of view extending horizontally and outwardly from the front of the autonomous vehicle. Once per scan cycle (e.g., at a rate of 20 hz), the RADAR sensor can output an object list for objects detected in its field of view (e.g., up to 64 objects), such as including: an azimuthal angle relative to the RADAR sensor, a distance from the RADAR sensor, and a speed relative to the RADAR sensor (i.e., relative to the autonomous vehicle more generally) for each object in the object list. In this example, the autonomous vehicle can: detect a set of dynamic objects in the current 3D point cloud; selectively populate groups of points in the current 3D point cloud corresponding to these objects with velocities detected by the RADAR sensor; render this augmented 3D point cloud on the interior display inside the autonomous vehicle; and render velocity tags linked to groups of pixels corresponding to these dynamic objects in the 3D point cloud or with these groups of pixels rendered in color values based on speeds of their corresponding dynamic objects.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. One or more tangible non-transitory computer-readable storage media storing computer-executable instructions for performing a computer process on a computing system, the computer process comprising:

accessing a two-dimensional (2D) image captured using a camera of a vehicle;

accessing a three-dimensional (3D) point cloud captured using a 3D sensor of the vehicle;

generating a 3D virtual environment representing a field external to the vehicle by projecting at least a portion of the 2D image onto a group of points in the 3D point cloud, the group of points representing a surface in the field external to the vehicle; and rendering the 3D virtual environment for display on a remote operator display, the vehicle being remotely operated using the 3D virtual environment displayed on the remote operator display, wherein the vehicle is remotely operated following at least one of identification of at least one operational issue of the vehicle or receipt of a request for remote assistance.

2. The one or more tangible non-transitory computer-readable storage media of claim 1, the computer process further comprising:

determining at least one navigational action for the vehicle using the 3D virtual environment displayed on the remote operator display; and sending the at least one navigational action to the vehicle.

3. The one or more tangible non-transitory computer-readable storage media of claim 1, the computer process further comprising:

identifying a perception failure of the vehicle, the at least one operational issue including the perception failure.

4. The one or more tangible non-transitory computer-readable storage media of claim 1, the computer process further comprising:

determining an alignment between the camera and the 3D sensor using the 3D virtual environment displayed on the remote operator display, at least one of the camera or the 3D sensor being calibrated based on the alignment.

5. The one or more tangible non-transitory computer-readable storage media of claim 1, wherein the 3D virtual environment is generated in response to detection of an event encountered by the vehicle, the computer process further comprising:

determining whether the event affected operation of at least one of the camera or the 3D sensor using the 3D virtual environment.

6. The one or more tangible non-transitory computer-readable storage media of claim 1, the computer process further comprising:

remotely diagnosing the at least one operational issue of the vehicle using the 3D virtual environment displayed on the remote operator display.

7. The one or more tangible non-transitory computer-readable storage media of claim 1, the computer process further comprising:

identifying the group of points by approximating a plane in the 3D point cloud, wherein projecting the portion of the 2D image comprises augmenting the group of points with color data from the 2D image.

8. The one or more tangible non-transitory computer-readable storage media of claim 1, the computer process further comprising:

isolating a group of color pixels representing the surface in the 2D image, wherein projecting the portion of the 2D image comprises projecting the group of color pixels onto the surface in the 3D point cloud.

9. A method comprising:

accessing a two-dimensional (2D) image captured using a camera of a vehicle;

accessing a three-dimensional (3D) point cloud captured using a 3D sensor of the vehicle;

generating a 3D virtual environment representing a field external to the vehicle by projecting at least a portion of the 2D image onto a group of points in the 3D point cloud, the group of points representing a surface in the field external to the vehicle;

displaying the 3D virtual environment on a remote operator display; and remotely operating the vehicle using the 3D virtual environment displayed on the remote operator display, wherein the vehicle is remotely operated following at least one of identification of an operational issue of the vehicle or receipt of a request for remote assistance.

10. The method of claim 9, wherein the 3D virtual environment includes a first portion rendered with a first resolution and a second portion rendered with a second resolution, the first resolution being higher than the second resolution and the first portion having a higher priority than the second portion.

11. The method of claim 9, wherein the 3D virtual environment is generated in response to detection of an event encountered by the vehicle, the method further comprising:

remotely diagnosing the vehicle following the event using the 3D virtual environment displayed on the remote operator display.

12. The method of claim 9, wherein remotely operating the vehicle comprises:

determining at least one navigational action for the vehicle using the 3D virtual environment displayed on the remote operator display; and sending the at least one navigational action to the vehicle.

13. The method of claim 9, further comprising:

determining an alignment between the camera and the 3D sensor using the 3D virtual environment displayed on the remote operator display; and calibrating at least one of the camera or the 3D sensor based on the alignment.

14. A system comprising:

a remote operator system in communication with a vehicle over a network, the vehicle including a camera configured to capture a two-dimensional (2D) image and a three-dimensional (3D) sensor configured to capture a 3D point cloud, the remote operator system having at least one process configured to generate a 3D virtual environment representing a field external to the vehicle by projecting at least a portion of the 2D image onto a group of points in the 3D point cloud, the group of points representing a surface in the field external to the vehicle; and a remote operator display configured to display the 3D virtual environment, the vehicle being remotely operated using the 3D virtual environment displayed on the remote operator display, wherein the vehicle is remotely operated following at least one of identification of at least one operational issue of the vehicle or receipt of a request for remote assistance.

15. The system of claim 14, wherein remotely operating the vehicle comprises:

determine at least one navigational action for the vehicle using the 3D virtual environment displayed on the remote operator display; and send the at least one navigational action to the vehicle.

* * * * *